United States Patent [19]

Malow

[11] Patent Number: 5,295,572
[45] Date of Patent: Mar. 22, 1994

[54] DEVICE FOR PIVOTING A PIVOTABLE MODULE OUT OF THE PATH OF A CONVEYOR BELT

[75] Inventor: Siegmar Malow, Constance, Fed. Rep. of Germany

[73] Assignee: Licentia Patent-Verwaltungs-GmbH, Frankfurt, Fed. Rep. of Germany

[21] Appl. No.: 930,613
[22] PCT Filed: Feb. 4, 1992
[86] PCT No.: PCT/EP92/00228
  § 371 Date: Oct. 5, 1992
  § 102(e) Date: Oct. 5, 1992
[87] PCT Pub. No.: WO92/13784
  PCT Pub. Date: Aug. 20, 1992

[30] Foreign Application Priority Data

Feb. 8, 1991 [DE] Fed. Rep. of Germany ....... 4103849

[51] Int. Cl.⁵ ............................................. B65G 15/14
[52] U.S. Cl. ................................. 198/626.1; 198/861.6
[58] Field of Search ............... 198/626.1, 626.2, 861.6, 198/587

[56] References Cited

U.S. PATENT DOCUMENTS

| | | | |
|---|---|---|---|
| 3,169,630 | 2/1965 | Christiansen | 209/600 |
| 5,178,523 | 1/1993 | Fix | 198/861.6 X |
| 5,188,210 | 2/1993 | Malow | 198/587 X |

FOREIGN PATENT DOCUMENTS

| | | |
|---|---|---|
| 572687 | 11/1958 | Belgium . |
| 2601309 | 7/1976 | Fed. Rep. of Germany . |
| 3122733 | 3/1982 | Fed. Rep. of Germany . |
| 2080777 | 11/1971 | France . |
| 2104687 | 4/1972 | France . |

OTHER PUBLICATIONS

Technica, Bd. 24, 1983, Zürich, pp. 2083–2088; K. Hain: "Flexible Handhabungsgetriebe mit ..."
Industrial Press Inc., 1970, N.Y., pp. 16-2; H. L. Stewart: "Hydraulic And Pneumatic ..."
H. Czichos: "Hütte, Die Grundlagen der ..." 1989, springer-Verlag, pp. K47, 48.
Automation, Dec. 1966, pp. 79, 82; J. G. Kay: "Flow Dividers For ..."

Primary Examiner—Cheryl L. Gastineau
Attorney, Agent, or Firm—Spencer, Frank & Schneider

[57] ABSTRACT

The invention relates to a device for pivoting a pivotable module out of the path of a conveyor belt. The device is composed of a coupling triangle whose corner points are pivotally arranged in such a manner that one corner point is pivotally disposed at the pivotable module and the other two corner points are pivotally arranged at the piston rods of actuating cylinders. The housings of the actuating cylinders constitute the fixing points for the pivoting movement of the coupling triangle. The pivoting movement of the coupling triangle is effected in that only one cylinder is actuated and the other cylinder remains in its withdrawn or extended state to act as a rod.

6 Claims, 3 Drawing Sheets

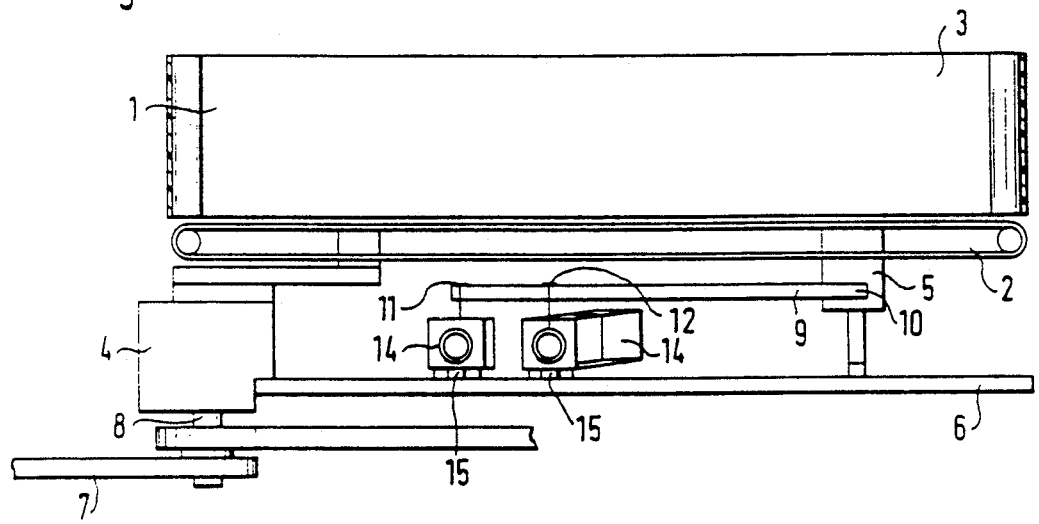
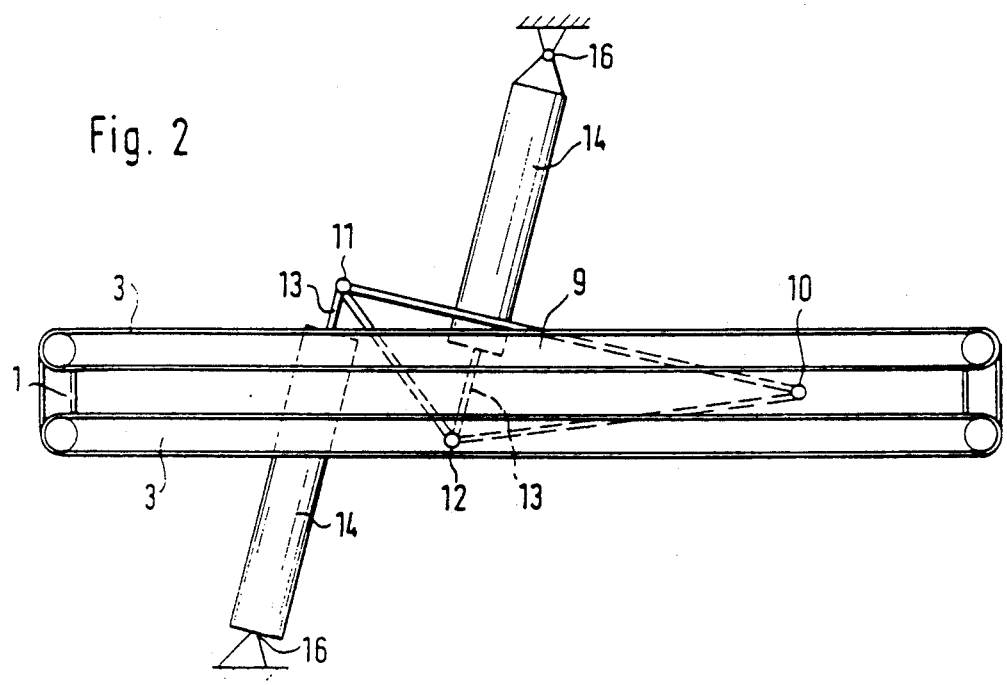

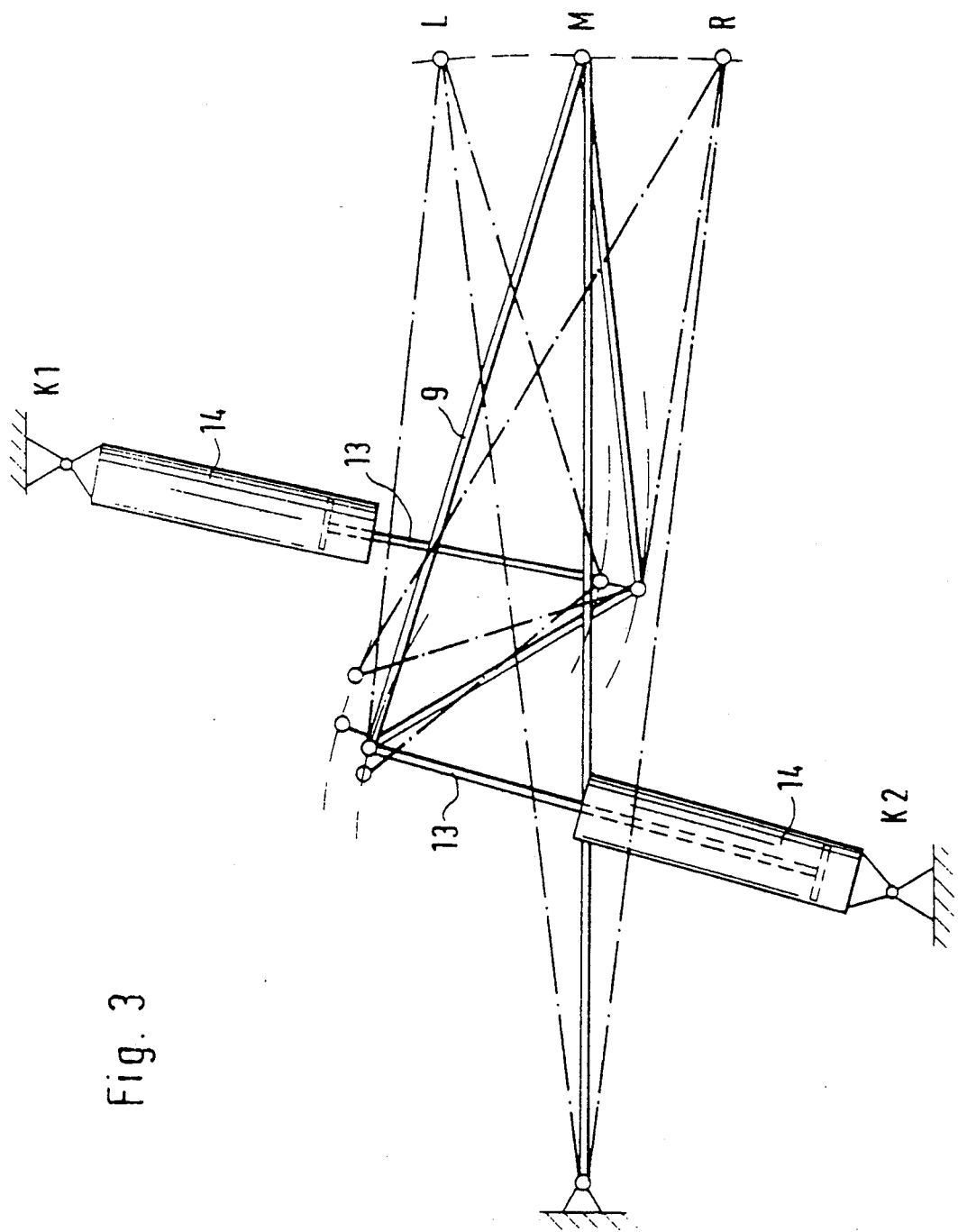

DEVICE FOR PIVOTING A PIVOTABLE MODULE OUT OF THE PATH OF A CONVEYOR BELT

BACKGROUND OF THE INVENTION

The invention relates to a device for pivoting a pivotable module out of the path of a feed or discharge conveyor belt.

French Application FR-A-2,104,687 discloses a pivotable module which is pivotable to the left or right within the framework of a conveying path. The pivoting here takes place on a circular path within a guide rail.

SUMMARY OF THE INVENTION

It is an object of the invention to provide a pivoting device for a pivotable module which permits a quick, attenuated pivoting process without attenuating stops being required at the end of the pivoting movement.

The above and other objects are accomplished according to the invention by the provision of a device for pivoting a pivotable conveyor belt module out of a conveyor belt path. The device comprises a coupling triangle which has three corner points arranged to be pivotable. One corner point is arranged to be pivotable (articulated) at the pivotable module, and the other two corner points are arranged to be pivotable at the piston rods of respective actuation cylinders. The housings of the actuation cylinders form respective fixing points for the pivoting movement of the coupling triangle. Springs are disposed on the piston rods in such a way that, during the pivoting movement, the springs of one cylinder provide support for the pivoting movement while the springs of the other cylinder provide for attenuation in end position of the associated piston rod.

BRIEF DESCRIPTION OF THE DRAWINGS

One embodiment of the invention will now be described with reference to the attached drawing figures in which:

FIG. 1 is a schematic representation of a pivotable module;

FIG. 2 is a schematic top view of the pivotable module with a coupling triangle disposed therebelow and the actuation cylinders;

FIG. 3 is a schematic representation of the movement of the coupling triangle during pivoting to the left and right;

DETAILED DESCRIPTION OF THE INVENTION

Figure 4:
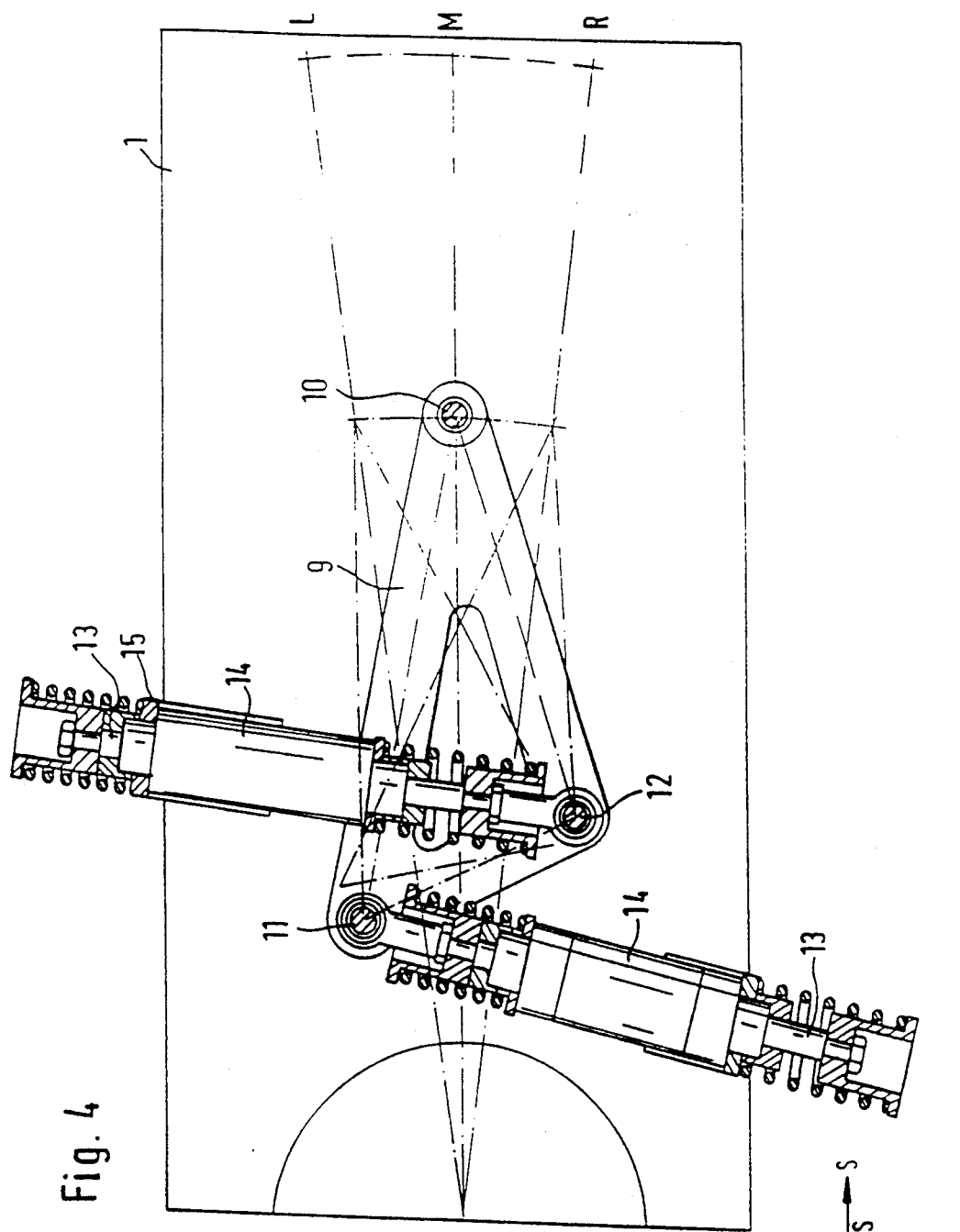
FIG. 4, shows the structural configuration of the coupling triangle and the two actuating cylinders.

In FIG. 1, reference numeral 1 identifies a pivotable module composed of an underfloor belt 2 and lateral belts 3. Pivotable module 1 is pivotally mounted on a bearing block 4 and is supported by way of a supporting bridge 5 on a base plate 6 which is rigidly fastened to bearing block 4. The belts are driven by means of a belt drive 7 whose shaft 8 is brought through the bearing block.

Below pivotable module 1, a coupling triangle 9 is disposed whose one corner point 10 is rotatably articulated to supporting bridge 5 and whose two other corner points 11 and 12 are articulated to the push rods 13 of pneumatic cylinders 14. By way of bearing flanges 15, the housings of pneumatic cylinders 14 are rigidly fastened to base plate 6. This is shown schematically in FIGS. 2 and 3 by the rigid attachment of the end points 16 of cylinders 14.

FIG. 3 shows the motion sequences of coupling triangle 9 when the push rods 13 of cylinders 14 are actuated.

In the rest position, center position M is taken up, that is cylinder K1 is extended and cylinder K2 is in the withdrawn position. If it is intended, for example, to pivot out to the left, cylinder K1 moves into the withdrawn position and cylinder K2 remains in its withdrawn state. Pivotable module 1 then remains pivoted outwardly until the material to be discharged has passed through the conveying channel. Then the center position is taken up again. When pivoting to the right (starting from the center position), cylinder K2 moves out; cylinder K1 retains its state, that is, regardless of whether it has been pivoted out to the left or right. Two cylinders never move simultaneously; instead, depending on the deflection direction, only one cylinder at a time is in action, the other cylinder acts as a rod. Intermediate positions between M and R and M and L are also possible. Depending on the arrangement it is possible, for example, to use these intermediate positions to realize a parallel displacement or an additional position between pivot points M and R and M and L. All positions, L, M, R and the intermediate positions, are so-called extreme positions, that is, cylinders K1 and K2 are always either extended or retracted into their end positions.

Due to the arrangement of pneumatic cylinders it is possible to obtain attenuation for pivoting by way of the cylinders in the retracted and in the extended position.

FIG. 4 shows an embodiment in which two mutually independent resonant systems can be built up with the use of tension springs and compression springs (17) at the push rods 13 of pneumatic cylinders 14 (K1 and K2). By arranging these springs (17), it is possible to consider only the friction and the respective mass to be pivoted since the energy required for pivoting out the module is not lost but is stored in the form of spring energy. Thus, due to the attenuating effect of the spring, the components that are under mechanical stress are subjected to significantly less stress. This thus leads to an increase in the service life of the system and in higher pivoting frequencies. Cylinders 14 (K1 and K2) then perform an arresting function for the respective resonant systems and purely an acceleration function for the pivoting action, with the spring system in each case acting supportingly or reducingly.

Figure 5:
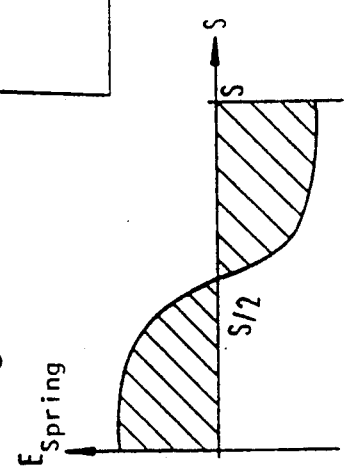
FIG. 5 is a graph of the spring energy as a function of path.

FIG. 5 is a graph of the spring energy as a function of path. If pneumatic control cylinders are employed, the pivoting frequencies may also be changed by way of the pneumatic setting.

I claim:

1. A device for pivoting a pivotable conveyor belt module comprising: a coupling triangle having three corner points arranged to be pivotable such that one corner point is arranged to be pivotable at the pivotable module and the other two corner points are arranged to be pivotable at respective piston rods of respective actuation cylinders, with each of the actuation cylinders having a respective housing which forms a respective fixing point for the pivoting movement of the coupling triangle; and springs disposed on the piston rods of the respective actuating cylinders such that, during the pivoting movement, the springs of one cylinder provide support for the pivoting movement while the springs of the other cylinder provide for attenuation in an end position of the respective piston rod.

2. A device according to claim 1 wherein the actuating cylinders are rigidly fastened to a base plate by means of bearing flanges.

3. A device according to claim 2 wherein the base plate is rigidly fastened on a bearing block and the pivotable module is arranged to pivotable about the bearing block.

4. A device according to claim 1 wherein the pivotable module is pivotally supported by way of a supporting bridge.

5. A device according to claim 1 wherein the springs are disposed on the respective piston rods between the respective one of the other two corner points of the coupling triangle and the housing of the associated actuating cylinder.

6. A method of actuating a device according to claim 1, comprising the step of actuating only one cylinder at any one time while the other cylinder, which is in the withdrawn or the extended state, acts as a rod.

* * * * *